March 3, 1942.  W. P. HUTCHINSON ET AL  2,274,697
METER STRUCTURE INCORPORATING PRESSURE RELIEVING DEVICE
Filed Dec. 8, 1938  3 Sheets-Sheet 3

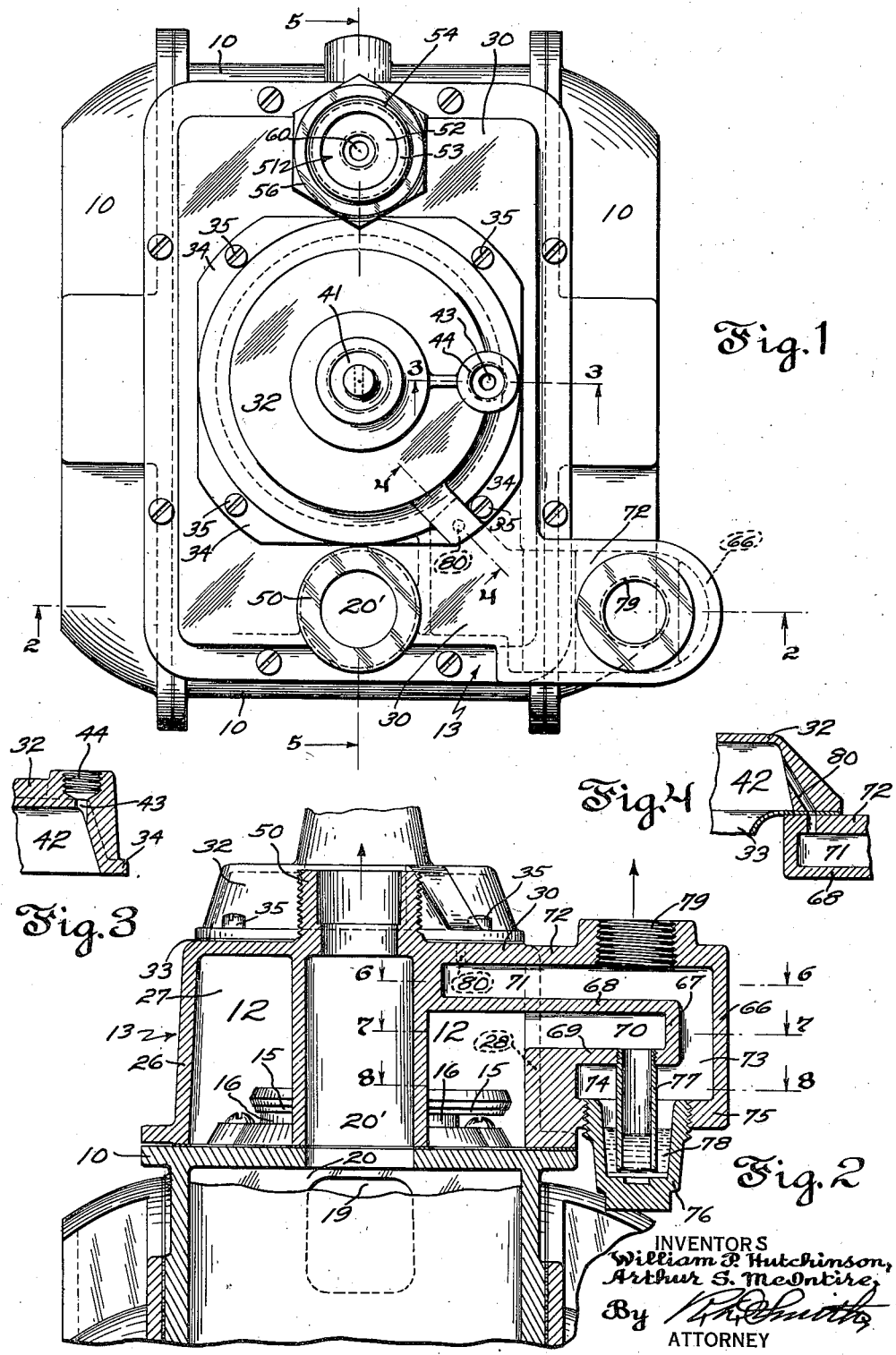

INVENTORS
William P. Hutchinson,
Arthur S. McIntire,
By V. R. Smith
ATTORNEY

Patented Mar. 3, 1942

2,274,697

UNITED STATES PATENT OFFICE 2,274,697

METER STRUCTURE INCORPORATING PRESSURE RELIEVING DEVICES

William P. Hutchinson and Arthur S. McIntire, Bridgeport, Conn., assignors to The Sprague Meter Company, Bridgeport, Conn., a corporation of Connecticut Application December 8, 1938, Serial No. 244,628

6 Claims. (Cl. 73—199)

This invention relates to gas meters structurally combined with automatic controls such as pressure relief devices and particularly concerns head units for gas meters which incorporate such controls for the gas which passes into or out of the meter.

A general object of the invention is to provide a gas meter having provision for the direct connection to its casing structure of three separate gas pipes or conduits and serving to house a pressure relief device or fluid seal in addition to the usual gas measuring apparatus, one of the said pipes leading gas from the service line to the meter, another of said pipes leading gas which has been measured in the meter from the meter to the house lines, and still another of said pipes serving to lead gas which upon occasion may escape past said fluid seal away from the meter into a vent line.

A further object is to incorporate such fluid seal within such head unit in a very compact way and in a way not to interfere with the accustomed assemblage of the unit casting to the meter body casting, and further in a way not to encroach upon the movable valve mechanism and register mechanism customarily housed within the head unit of the Sprague type of gas meter.

A further object is to provide a liquid seal control embodying improved features of construction and operation particularly suiting it to incorporation within a meter head.

A still further object is to render the pressure reactive instrumentality of the pressure relieving or fluid seal control directly and sensitively exposed to pressure of the body of gas contained within a common reservoir chamber which communicates intimately with the measuring chambers of the meter.

The foregoing and other objects of the present improvements will become clear from the the following description of structure embodying one of the possible forms of the invention, in which description reference is had to the accompanying drawings wherein:

Fig. 1 is a plan view of a Sprague type of meter equipped with a head unit incorporating a pressure regulator and a fluid-sealed pressure relief outlet embodying the present improvements.

Fig. 2 is a side elevation taken partly in section on the plane 2—2 in Fig. 1 looking in the direction of the arrows.

Fig. 3 is a fragmentary view taken in section on the plane 3—3 in Fig. 1 looking in the direction of the arrows.

Fig. 4 is a fragmentary view taken on the plane 4—4 in Fig. 1 looking in the direction of the arrows.

Figure 5:
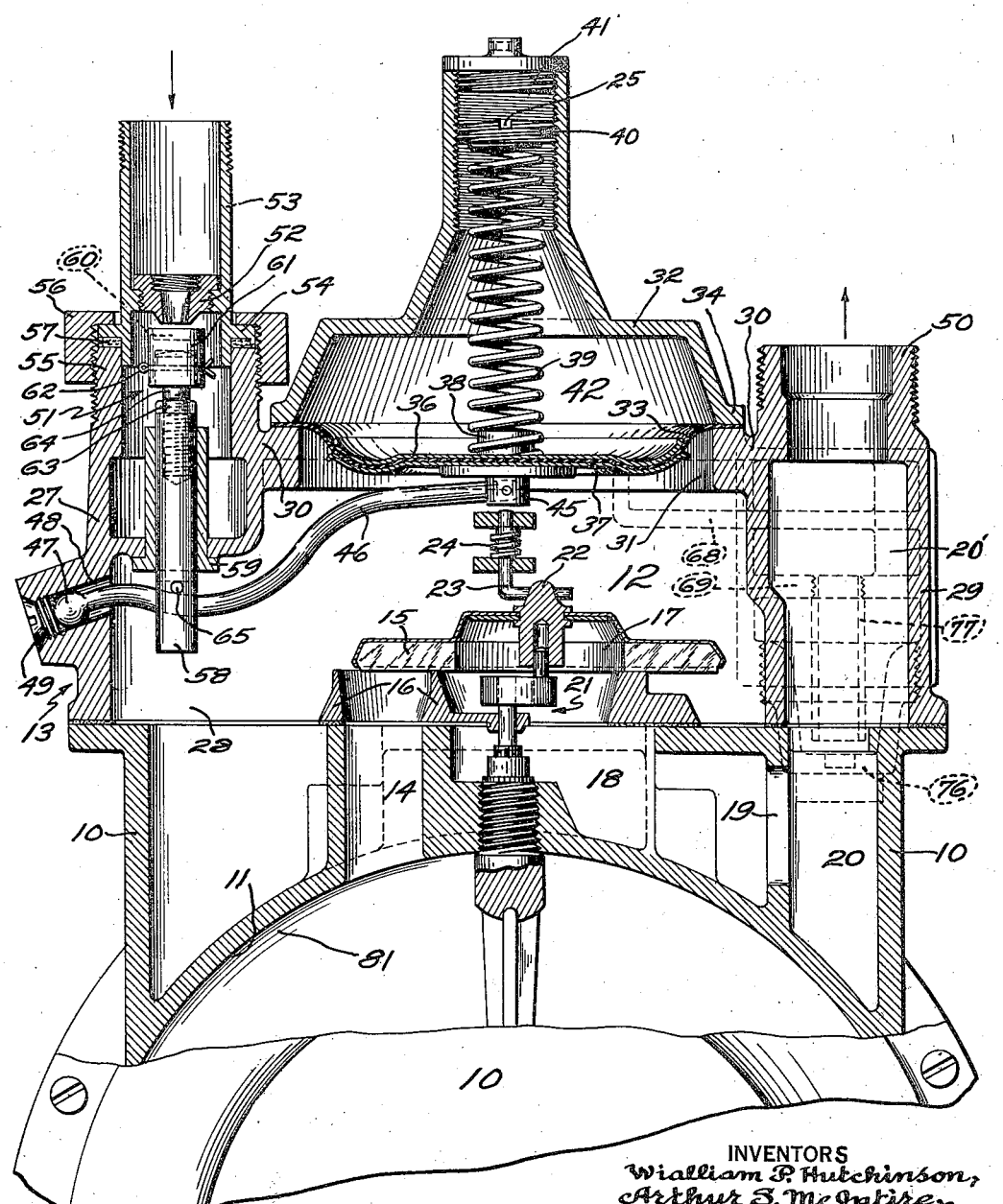
Fig. 5 is a front view taken partially in section on the plane 5—5 in Fig. 1 looking in the direction of the arrows.
Figure 6:
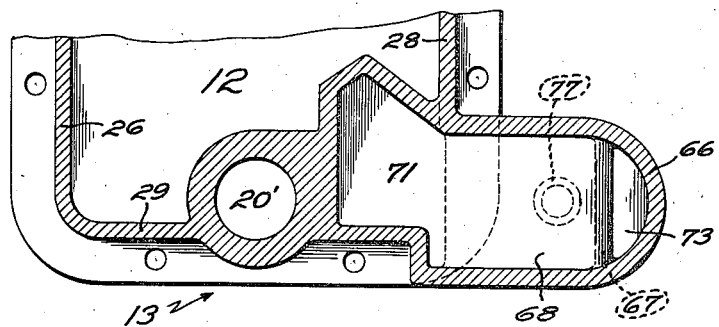
Fig. 6 is a fragmentary plan view taken in section through an upper portion of the fluid-sealed passageway on the plane 6—6 in Fig. 2.

The Sprague type of gas meter herein illustrated may consist of a hollow main body 10 constructed and housing gas metering chambers and apparatus of the general kind illustrated and described in U. S. Patent No. 722,390 granted March 10, 1903 to H. H. Sprague, or as illustrated and described in the copending application of Arthur S. McIntire, Serial No. 219,851, filed July 18, 1938. In these forms of the Sprague meter, the measuring chambers such as 11 in the main body 10 of the meter have communication with the pressure chamber 12 in the head unit casting 13 through passageway such as 14 which are opened up or cut off in predetermined sequence and timed relationship by the movement of a centrally hollowed out valve disc 15 which rides in sliding contact with the smooth top edges of clover leaf partitions 16. By aid of its central hollow portion 17, this valve disc in its sliding movement also opens and closes communication between the said passageways and a central well 21 which communicates through outlet 19 with the exhaust passageway 20. Valve disc 15 is moved by crank mechanism indicated generally at 21 and carries an upstanding projection 22 which impels the radial arm 23 of a register mechanism 24 occupying the pressure chamber 12 and which it will not be necessary herein to describe in greater detail. It will be observed that a sizable amount of the available space in pressure chamber 12 is occupied by the oscillating valve disc 15 and the register mechanism 24 which it motivates.

Because of the desirability of small size and compact proportions in gas meters which are often required to occupy close quarters under modern conditions of residence installation it is of great advantage to be able to avoid the former practice of more or less widely separating, and connecting by pipe lines, the gas metering, pressure regulating and fluid-sealed pressure relief devices employed. This is best done by incorporating the functions of these formerly remotely located units in apparatus entirely housed within the structure of the gas meter itself. It is highly desirable in doing this that the accustomed overall sizes and characteristic shapes and proportions of the meter as a whole be altered as little as possible so that a meter embodying these improvements may be installed interchangeably with meters not containing these novel features. At the same time, the interior operating parts of the meter such as valve disc 15 and the register mechanism 24 must not be encroached upon. In the structure herein chosen to illustrate the invention, means for regulating the pressure of gas in the chamber 12, and for permitting an emergency escape of gas from said chamber should the pressure therein become too high, are incorporated together within the structure of the head unit 13 in a manner satisfying all of the above stated requirements.

In general the head casting 13 is made up of the roof wall 30 together with the vertical walls 26, 27, 28 and 29, respectively, at the front, left side, rear, and right side of the unit. From roof wall 30 rises the threaded gas outlet boss 50 for the usual connection of piping leading from the meter to the house lines, the same forming the top end of an exhaust passageway 20' which itself forms an upward continuation of the aforesaid exhaust passageway 20 and is isolated from pressure chamber 12 by the partition wall 29'.

Roof wall 30 contains a large circular opening 31 capped by the dome-like housing 32 between whose bottom edges and the top surface of roof wall 30 the marginal portion of a flexible diaphragm 33 is clamped, flanges 34 on housing 32 being drawn against roof wall 30 by the holding screws 35. Diaphragm 33 is reenforced by the top plate 36 and by the bottom plate 37 and carries centrally thereof a flanged plug member 38 over which fits the bottom end of the coiled compression spring 39 whose top end bears upwardly against compression adjusting plug 40 having threaded engagement with the interior of the neck of housing 32 and slotted at 25 to receive a screw driver or other compression adjusting tool. In service the top end of the dome housing 32 is covered by the plug cap 41 which likewise has threaded engagement with the interior of the housing neck and may be removed to give access to the adjusting plug 40.

To insure that the air within the atmospheric chamber 42 in housing 32 shall be at atmospheric pressure, the vent hole 43 is provided giving free communication from chamber 42 to atmosphere, and its threaded counterbore 44 is adapted to receive a threaded pipe for leading gas away from the vicinity of the meter in case diaphragm 33 should accidentally become punctured. Vent hole 43 may be omitted or the threaded counterbore 44 may be filled and closed by a solid plug when passageway 80 is employed as hereinafter described.

In rigid relation to the spring engaging plug member 38, diaphragm 33 carries centrally on the lower surface of plate 37 a hinge block 45 to which is pivotally connected the floating end of an S-shape lever 46 whose opposite end is enlarged into the shape of a ball 47 turnably pocketed within the inclined bore 48 extending through wall 27 of the head unit casting. The outer end of bore 48 is threaded and plugged by the screw 49. A gas pressure regulator valve indicated as a whole at 51 includes a bushing 52 presenting a downwardly directed valve seat and vertically adjustable by means of threaded engagement with the hollow spud 53 whose flange 54 is clamped downwardly against the top of the inlet boss 55 of the head casting by means of the coupling nut 56 having threaded engagement with boss 55. A gasket 57 insures a gas tight joint between the spud and the casting boss. The movable parts of the valve include a plunger 58 freely slidable vertically in the bearing bushing 59 thereby to carry the valve disc 60 toward and away from the valve seat of bushing 52. The valve disc is embedded in the top of cap cylinder 61 which surrounds and is supported on the round-topped head of a screw 64 and secured thereto by the cotter pin 62. Screw 64 has threaded engagement with the top end of plunger 58 and is locked in adjusted position relative thereto by the nut 63. At its bottom projecting end plunger 58 carries the cross pin 65 which rides on the top of lever 46 so that plunger 58 rises and falls as lever 46 swings upwardly and downwardly about its ball terminal 47.

Referring now to the pressure relief valve or mercury seal, which by these improvements is novelly incorporated in the casting of the meter head unit, Figs. 1, 2 and 6 to 8, inclusive, best show certain extensions and conformations given to the rear wall 28 and to the side wall 29 of the head unit casting and to certain additional partition walls for forming suitable passageways constituting a fluid-sealed outlet that neither interferes with the accustomed manner of assembling the head unit to the main body of the meter nor encroaches upon the moving apparatus housed by the head unit, nor substantially alters the overall dimensions and customary proportions of the Sprague meter as a whole.

Figure 7:
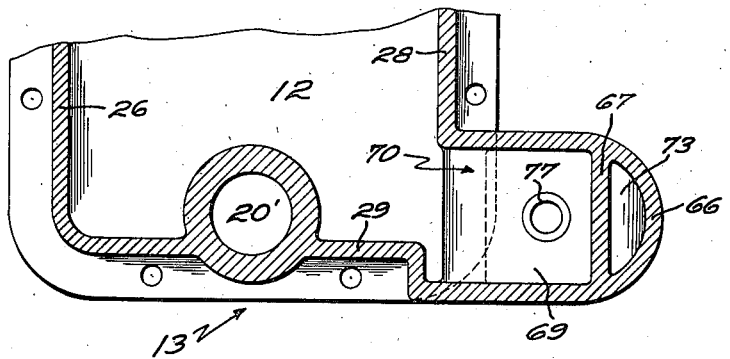
Fig. 7 is a fragmentary plan view taken in section at a lower level through the fluid-sealed passageway on the plane 7—7 in Fig. 2.
Figure 8:
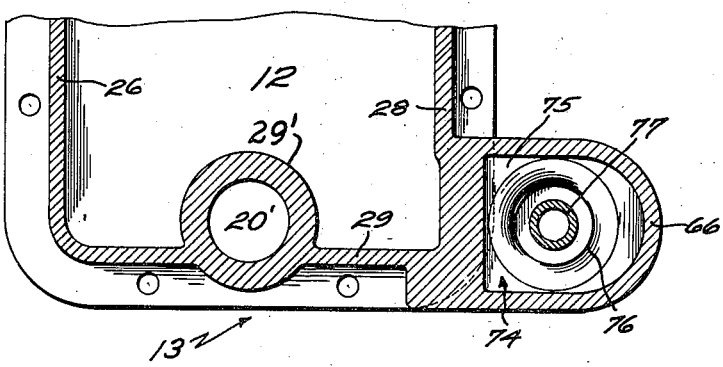
Fig. 8 is a fragmentary plan view taken in section at a still lower level through the fluid sealed passageway on the plane 8—8 in Fig. 2.

At the level of the plane 7—7 in Fig. 2 the rear wall 28 is in one portion set back to the distance represented by the position of the curved wall 66 in Fig. 7. Inside of this setback section of the rear wall, the horizontal partition walls 68 and 69 together with the vertical partition wall 67 form the exhaust cove 70 communicating with the pressure chamber 12.

The upper horizontal space 71 (between partition wall 68 and the backward extension 72 of roof wall 30) communicates through the vertical space 73 (between walls 67 and 66) with the lower horizontal space 74 (between partition wall 69 and the floor wall 75 of the set back section of the head casting). A depending liquid holding cup 76 at its top open end has threaded engagement with a hole in the floor wall 75. The vertical exhaust tube 77 is open at both top and bottom, and its open top end has threaded engagement with a hole in partition wall 69 so that tube 77 depends from wall 69 and occupies cup 76. A body of suitably heavy liquid 78 such as mercury, occupies the cup 76 and rises in tube 77 to effect a liquid seal between pocket 70 and the discharge space 74. From space 74 gas which has escaped from the bottom end of tube 77 past the liquid 78 may find outlet upwardly through the space 73 to the threaded outlet 79 which is adapted to be piped to some safe point remote from the meter. To guard against the pressure in space 42 becoming greater or less than atmospheric in case the vent 43 is closed and to provide for escape of gas from chamber 42 into the pocket-like space 71, the latter in Fig. 4 is seen to communicate with the atmospheric chamber 42 in the dome housing 32 by means of a breather passageway 80 which extends through the top wall 30, through the margin of flexible diaphragm 33, and through the mounting flange 34 of housing 32.

In operation, as a self-contained combination gas meter, gas pressure regulator, and fluid-sealed relief valve, the apparatus hereinbefore described operates as follows:

When no gas is being discharged from the meter through outlet 20' for consumption in the house lines, the pressure of the gas in pressure chamber 12 equals the pressure of the gas in whichever measuring chamber therebelow may chance to be left in communication with pressure chamber 12 by valve disc 15, such as through passageway 14 in Fig. 5. When the meter is called upon for gas delivery by the opening, say, of some burner valve in the house lines, an immediaae lowering of pressure occurs in which ever adjoining measuring chamber is at that instant in communication with the outlet passageway 20, 20'. This pressure differential in the well known way exerts a force upon the motor diaphragm, such as 81, which separates the two said measuring chambers, which diaphragm has linkage connection, shown in the aforesaid patent or co-pending application for causing the crank mechanism 21 to rotate and motivate the valve disc 15 and thereby the arm 23 of the register mechanism. It is thus apparent that an excess of gas pressure in pressure chamber 12 might injure diaphragm 81 or some other working part of the gas meter and that an unsteady pressure of the gas in pressure chamber 12 will cause unevenness and other undesirable characteristics of operation of the metering apparatus as a whole.

If an excess of pressure should develop in chamber 12 despite the function of regulator valve 52—60, such excess pressure will, before it can harm working parts of the meter, force downwardly the mercury or other liquid in tube 77 and force upward the liquid in cup 76 until the gas can escape from chamber 12 past the liquid seal into vertical passageway 73 and through threaded opening 79 to the exterior of the meter. The passageways 74 and 73 are so ample that no part of the mercury or other sealing liquid will escape with the gas but all of it will return to its condition shown in Fig. 2 when sufficient gas has escaped to reduce the pressure in chamber 12 down to a safe point. Constant communication of cove 71 with the atmospheric pressure chamber 42 in the dome housing 32 through the connecting vent 80 insures against any pressure higher or lower than atmospheric pressure normally obtaining within either the spaces 71, 73 and 74 or the atmospheric chamber 42, itself.

As chamber 42 is maintained at atmospheric pressure while chamber 12 is subject to the varying higher pressure of gas delivered from the mains to the meter through spud 53 and valve 52, 60, an increase in the differential of these two pressures will push up on diaphragm 33 and swing lever 46 upwardly about its ball pivoted left end thus elevating pin 65, plunger 58 and the valve face 60 so that the latter cuts down or shuts off the inward flow of gas to the meter. This will arrest the building up of pressure within chamber 12. Conversely when the said differential of the said two pressures lessens, diaphragm 33 will permit the lever 46 to drop and thus lower the valve parts 65, 58, 61 and 60 for admitting more gas or a greater flow of gas to the meter.

An operating advantage affording increased safety for the metering apparatus against uneven and excessive pressures of gas delivered thereto is achieved by these improvements wholly additional to the economies of manufacture and simplification of installation which they make possible. The close working proximity of the diaphragm 33 and the seal liquid 78 to each other and to the pressure chamber 12 promotes more dependable, instantaneous and sensitive response both of the regulating valve and of the liquid seal to damaging changes in gas pressure in chamber 12 and in the measuring chambers than has heretofore been possible where the regulating valve and/or the pressure relief valve or fluid seal have been arranged at remote points and as separate units connected to the meter by pipe lines.

The appended claims are hence directed to and intended to include all substitutes and equivalents for the particular structure and arrangements of the parts herein shown which would be suggested by the disclosure hereof or otherwise come fairly within their terms.

We claim:

1. The combination with a hollow meter body containing diaphragm operating gas measuring chambers and passageways in communication therewith opening upward out of said body, of a hollow meter head detachably mounted on the top of said meter body comprising head walls defining a cap-like structure housing a gas pressure chamber into which said passageways directly open when the meter head is in place on the meter body, and a safety passageway leading outward from said pressure chamber to the exterior of said head sealed with liquid and defined by walls joining said head walls and extending to form a cove-like bulged out portion of said pressure chamber in conjunction with an outer portion of said safety passageway flanking said cove-like portion, whereby excessive pressure in a body of gas occupying at the same time said pressure chamber said measuring chambers and said passageways can instantaneously displace said sealing liquid and freely escape through a minimum length of said safety passageway.

2. The combination with a hollow meter body containing diaphragm operating gas measuring chambers and passageways in communication therewith opening upward out of said body, of a hollow meter head detachably mounted on the top of said meter body comprising head walls defining an open-bottomed cap-like structure housing a gas pressure chamber into which said passageways directly open when the meter head is in place on the meter body, and a safety passageway leading outward from said pressure chamber to the exterior of said head sealed with liquid and defined by portions of said head walls extended to form a cove-like bulged out portion of said pressure chamber in conjunction with an outer portion of said safety passageway flanking said cove-like portion, whereby excessive pressure in a body of gas occupying at the same time said pressure chamber said measuring chambers and said passageways can instantaneously displace said sealing liquid and freely escape through a minimum length of said safety passageway occasioning a minimum enlargement of said meter head.

3. A detachable head for a gas meter including conjoined walls forming a hollow cap-like structure, one of the lateral upright walls of said structure merging with a C-shaped wall bulging outward from said upright wall and forming a cove, an outer L-shaped wall conjoined with and extending co-directionally with and in spaced relation to a portion of said C-shaped wall defining an L-shaped passageway flanking said cove, and means of communication between said cove and said passageway sealed by a body of liquid.

4. The combination with a hollow meter body containing diaphragm operating gas measuring chambers and passageways in communication therewith opening upward out of said body, of a hollow meter head detachably mounted on the top of said meter body comprising head walls defining an open-bottomed cap-like structure housing a gas pressure chamber into which said passageways directly open when the meter head is in place on the meter body, and a safety passageway leading outward from said pressure chamber to the exterior of said head sealed with liquid and defined by portions of said head walls extended to form a cove-like bulged out portion of said pressure chamber and a return-bend portion of said safety passageway flanking said cove-like portion at its top bottom and side, whereby excessive pressure in a body of gas occupying at the same time said pressure chamber said measuring chambers and said passageways can instantaneously displace said sealing liquid and freely escape through a minimum length of said safety passageway occupying a minimum enlargement of said meter head.

5. A detachable head for a gas meter including conjoined walls forming a hollow cap-like structure, one of the lateral upright walls of said structure merging into two co-directional and relatively spaced C-shaped walls bulging outwardly from said upright wall and forming a cove bordered at top bottom and side thereof by a C-shaped passageway afforded by the space between said C-shaped walls and having means of communication with said cove sealed by a body of liquid.

6. In meter head construction affording a liquid seal, a hollow meter head casting having an opening in its roof wall, a dome superimposed above said opening forming an atmospheric chamber thereabove, said casting being cored to form a horizontal partition wall spaced below said roof wall beneath said chamber to form a vent compartment, said partition wall and said roof wall continuing outwardly and downwardly and then inwardly again in spaced relation to each other thereby to form a C-shaped extension of said vent compartment therebetween and a cove outwardly bordered by said compartment extension and separated therefrom by said partition wall, said partition wall having an opening communicating with said extension of the vent compartment through a liquid seal.

WILLIAM P. HUTCHINSON.
ARTHUR S. McINTIRE.